May 20, 1924.
W. G. HAWLEY
STEERING GEAR
Filed March 9, 1923
1,494,355
3 Sheets-Sheet 1
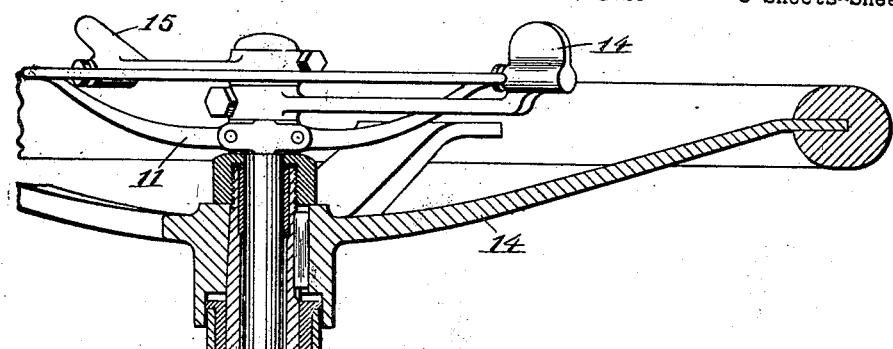
Fig. 1.
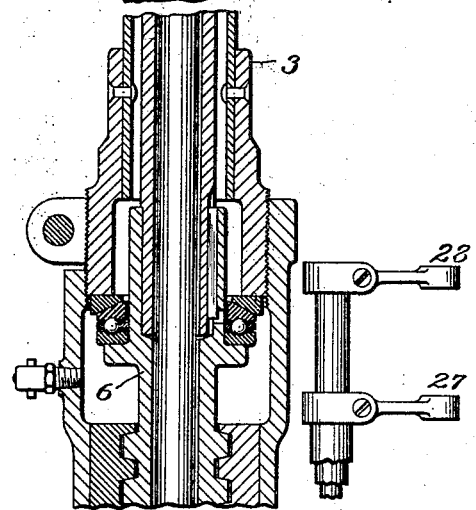
Fig. 2.
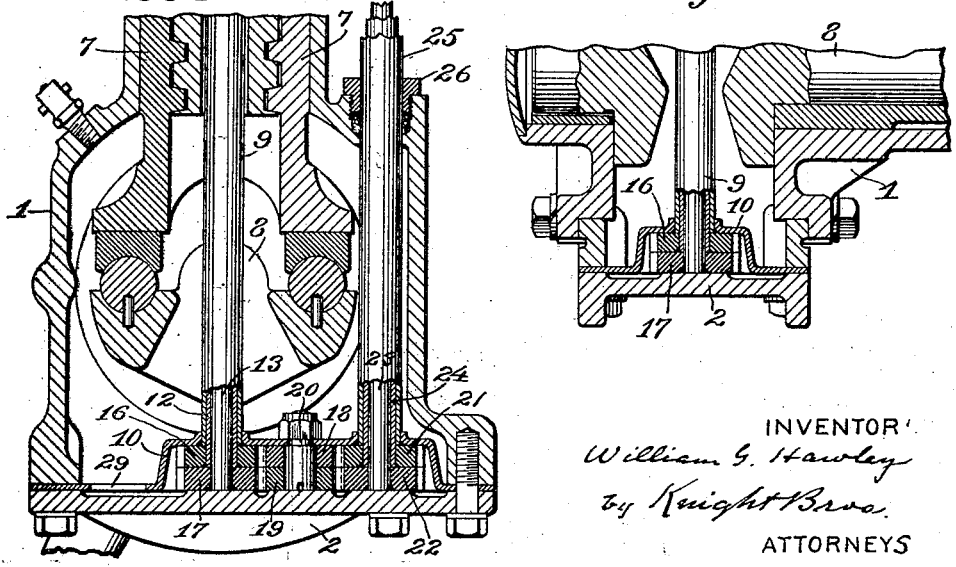
INVENTOR
William G. Hawley
by Knight Bros.
ATTORNEYS May 20, 1924.
W. G. HAWLEY
1,494,355
STEERING GEAR
Filed March 9, 1923
3 Sheets-Sheet 2
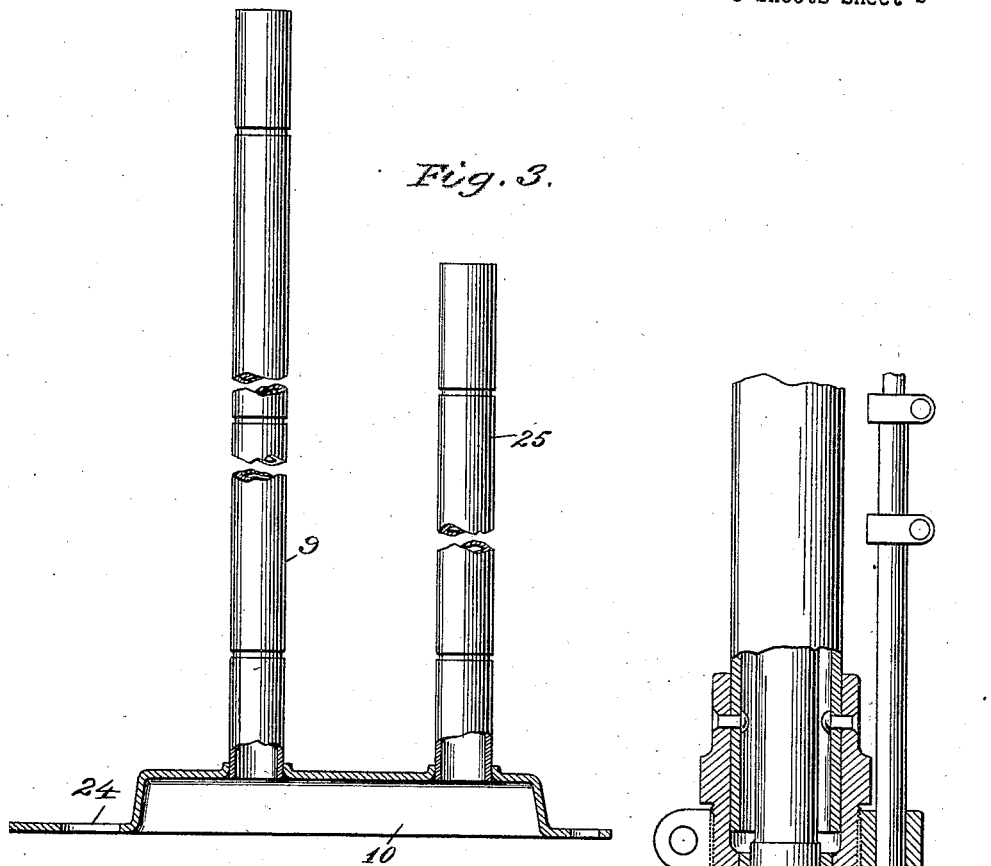
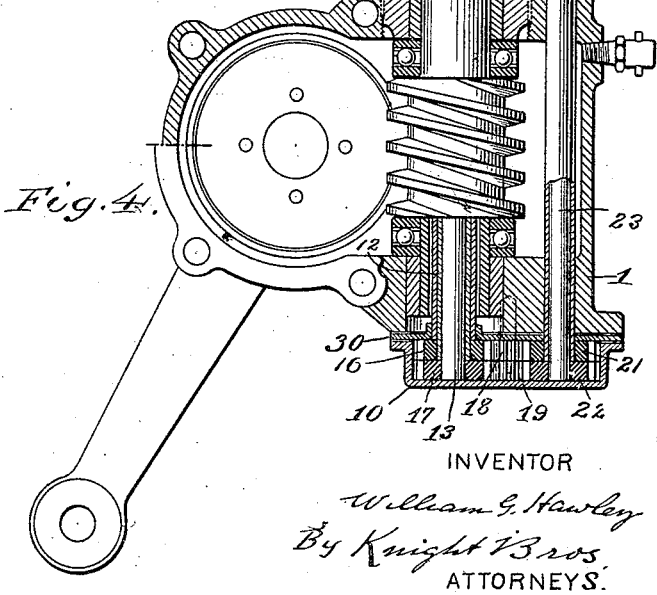
INVENTOR
William G. Hawley
By Knight Bros.
ATTORNEYS.

May 20, 1924.

W. G. HAWLEY 1,494,355

STEERING GEAR

Filed March 9, 1923  3 Sheets-Sheet 3

INVENTOR
William G. Hawley
BY Knight Bros.
ATTORNEYS.

Patented May 20, 1924.

1,494,355

UNITED STATES PATENT OFFICE.

WILLIAM G. HAWLEY, OF ELMIRA, NEW YORK.

STEERING GEAR.

Application filed March 9, 1923. Serial No. 623,981.

*To all whom it may concern:*

Be it known that I, WILLIAM G. HAWLEY, a citizen of the United States, and a resident of Elmira, county of Chemung, and State of New York, have invented certain new and useful Improvements in Steering Gears, of which the following is a specification.

This invention relates to certain combinations of parts in automobile steering gears and consists in a novel, convenient and efficient construction of a housing for the motor control rods and connecting gearing that are usually associated with the steering mechanism.

The usual practice is to have the spark and throttle control rods extend clear thru the steering column, the ends extending above the column having the manipulating levers attached and the ends extending below the column having gears or levers articulating with rods connected respectively to the carbureter and the distributer. Surrounding the control rods a stationary tube extends the whole length of the steering gear and this tube being secured at its lower end to the steering gear casing forms a stationary support at its upper end for the segment or spider around which the manipulating levers are adjustable. Such an arrangement while forming a convenient assembly leaves much to be desired in the matter of appearance and protection of the parts from dirt and grit as well as leakage of oil from the steering gear case.

In my present invention I provide a novel combination whereby all of these articulated parts of the control mechanism are housed in the steering gear casing in such a manner that they are protected from dirt and grit while the lower part of the said casing is sealed oil tight so that there is no chance for oil to leak out thru such places as control rod bearings.

My present invention further relates to means for housing the electric wires and the control rods and gears as will be more fully pointed out in the following description with reference to the accompanying drawings, in which—

Figure 1 represents an axial fore and aft section of a steering gear showing one embodiment of my invention;

Figure 2 represents a section thru the base of the gear at right angles to Figure 1;

Figure 3 is a side elevation and partial section of the sub-assembly of the control rod housing shown in Figure 1;

Figure 4 represents an axial section of a modified form that my invention may take.

Figure 5:
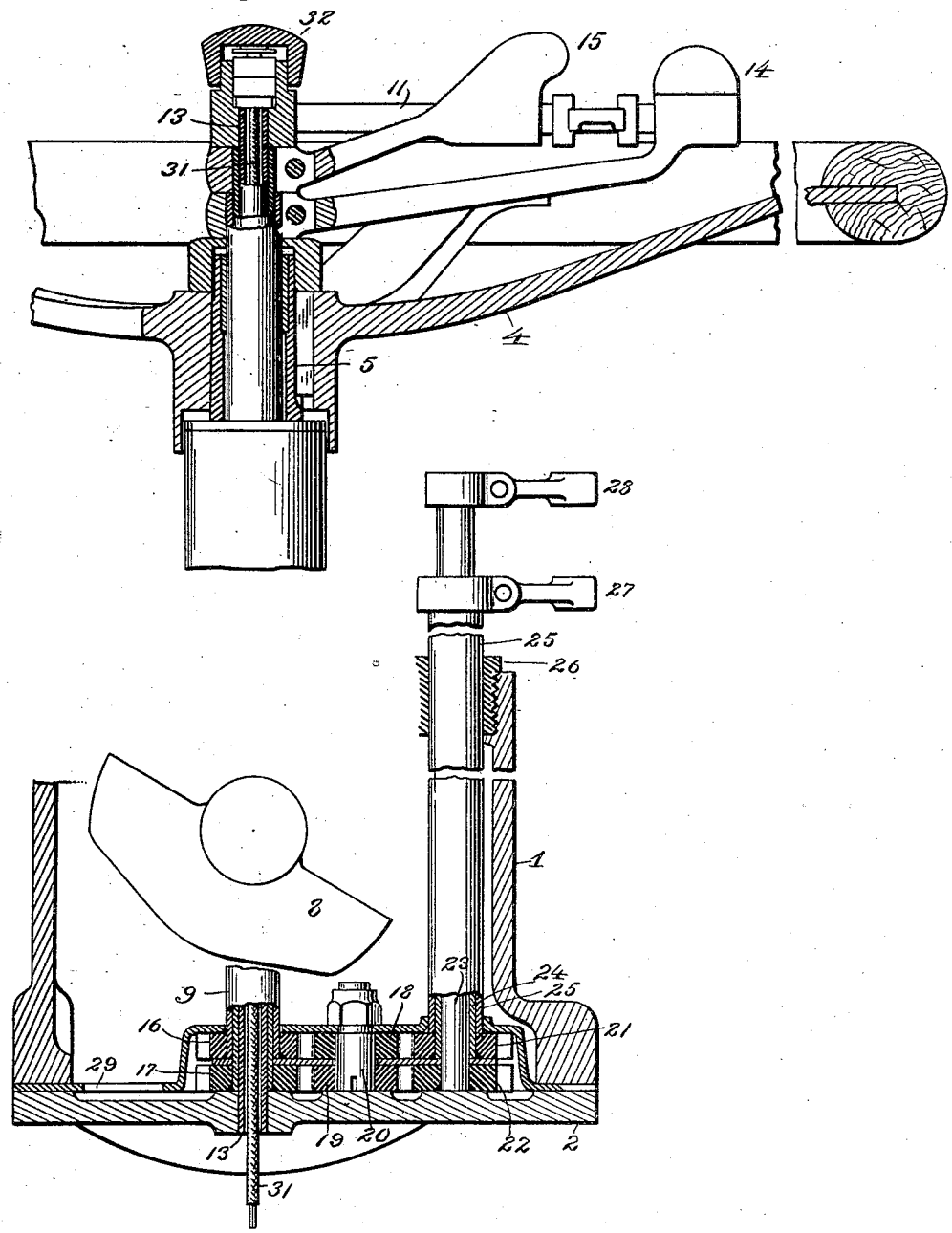
Figure 5 is a sectional view of a steering gear combining some of the features shown in the above modification with a central stationary tube containing the wires for the horn.

In the drawings, 1 represents a steering gear casing which is closed at its lower end by a bottom cover 2 and supports at its upper end a steering column 3. A steering wheel 4 is keyed to a steering tube 5 which in turn is keyed to a steering screw 6, Figures 1 and 2, having the usual right and left hand threads which engage with the right and left hand half-nuts 7 that control the steering rocker 8 in the well known manner. Extending thru the steering tube and screw is a tube 9 which at its lower end is brazed or otherwise attached to a gear cover or housing 10 and at its upper end has secured to it the control segment 11. Inside of the stationary tube 9 is a tubular control rod 12 and inside of this a control rod 13, securely attached to the upper ends of which are the spark and throttle handles 14 and 15. At their lower ends the control rods 12 and 13 have secured to them by brazing or otherwise, gears 16 and 17 respectively, which mesh with idler gears 18 and 19 on a central stud 20 and these in turn drive gears 21 and 22 that are similarly brazed or otherwise secured to secondary control rod 23 and tubular control rod 24 respectively. The secondary control rods 23 and 24 extend upwardly out of the casing and are preferably housed in a projecting tube 25 which is secured to the gear casing 10 in the same manner as the stationary tube 9. A stuffing box 26 surrounds the stationary tube where it passes thru the casing so as to at once facilitate the assembling and prevent the escape of lubricant. The upper ends of the secondary control rods have arms 27 and 28 secured to them and to these arms may be articulated the rods that operate the carbureter and the distributer.

It will be noticed that the steering rods are supported by the steering gear casing cover 2 and that the gear housing 10 has flanges which extend laterally so as to be clamped between the casing 1 and cover 2, (see Figures 1 and 2) with the result that the housing with its attached tubes are all held very securely and accurately in place while at the same time allowing of their ready withdrawal by simply removing the cover. An orifice such as shown at 29 in the flange will allow the lubricant in the steering gear casing to have access to the control gears.

The control rods do not pass down and out of the casing where they would be exposed to mechanical injury as well as to the weather, but on the contrary are all neatly housed with the rest of the mechanism inside of the casing, and the same remarks apply to the secondary control rods and their gears. In Figure 4, I have shown that the control rod gears may be housed in a casing which will itself form a cover at the lower end of the steering gear casing and I have shown also in this modification that the secondary control rods may dispense with the stationary protecting tube. In this case the cover 30 of the housing 10 performs the function of holding the stationary tube, the cover being in turn held by being clamped between the housing 10 and the steering gear casing 1. While I have shown the primary and secondary control rods and their tubular housings as parallel, they may be with slight modifications, evident to one skilled in the art, set at an angle so that the secondary rods would approximate a vertical position.

In the form shown in Figure 5, the functions of the tube 9 and the central rod 13 are reversed. In this case the central member is stationary and is secured to the bottom of the casing while it in turn has clamped to its upper end the control segment 11. The outer tube 9, on the other hand, is in this case used as a controlling rod and has secured to its lower end the control gear 16, the said tube passing freely thru the gear housing 10. Or there may be another stationary tube used in this case which would surround the rotatable tube 9 and such stationary tube would then be secured to the case 10 as shown in Figure 3. The central member is in the form of a tube thru which are drawn the electric wires 31 that lead from the horn to the signal button 32 mounted on the extreme upper end of the central member. Such a construction gives the neatest possible combination of all the essentials to a control system and forms at the same time the most convenient arrangement for assembly and sub-assembly.

An inspection of the drawings will show that all the lower articulated members of the control mechanism are disposed inside of a rugged oil tight casing that at the same time houses the steering gear itself and from this it follows that the said mechanism is thereby protected both from mechanical injury and from wear and tear, which on account of its frail construction becomes of considerable importance.

I claim:—

1. In a steering gear for automobiles, a steering gear housing having a removable bottom cover, primary control rods arranged within said housing and one within the other, gears secured to said primary control rods respectively, a gear cover between which and the removable bottom cover of said housing said gears are housed, and secondary control rods geared to said gears respectively.

2. In a steering gear for automobiles, a steering gear housing having a removable bottom cover, primary control rods arranged within said housing and one within the other, gears secured to said primary control rods respectively, a gear cover between which and the removable bottom cover of said housing said gears are housed, and secondary control rods geared to said gears respectively, said gear cover being provided with an orifice for oil.

3. In a steering gear, the combination of a steering column and gear casing, primary and secondary control rods housed in the casing and a removable bottom cover for the casing supporting said rods.

4. A steering gear, comprising a steering gear casing, primary and secondary control rods, in said casing, gears also within the casing connecting the control rods, a cover for said gears mounted on said casing and a stationary tubular housing for the rods secured to and supported by said cover.

5. A steering gear, comprising a steering gear casing, primary and secondary control rods, gears connecting them together at their lower ends, tubular housings for the rods and a cover for said gears uniting and supporting said tubular housings, said cover being supported by the steering gear casing.

6. A steering gear, comprising a steering tube, control rods extending thru the steering tube and having gears at their lower extremities, other control rods also having gears at their lower extremities which are geared to the aforesaid gears, tubular housings for both sets of controls and a gear cover for said gears uniting the said tubular housings.

7. A steering gear, comprising a steering gear casing, a steering tube, control rods passing downwardly into the casing thru the steering tube, other control rods passing upwardly out of the casing, intermeshing gears on the lower extremities of such control rods, a gear cover for such gears and tubular housings for said rods united by said gear cover.

8. In a steering gear, the combination of a steering wheel, a column and gear casing, a removable bottom cover for the casing, primary and secondary control rods in the casing and a central stationary tube secured to the casing and signal wires thru said tube from below the casing to a point above the steering wheel.

9. In a steering gear, the combination of a steering wheel, a steering column and gear casing, a removable bottom cover for the casing, primary and secondary control rods in the casing, connecting mechanism between said rods also in the casing, a central stationary tube secured to the said casing cover, signal wires passing thru the whole length of said tube and an electric circuit closer mounted on top of the said tube.

WILLIAM G. HAWLEY.